Feb. 24, 1959     L. A. PETERMANN     2,875,355
ULTRASONIC ZONE PLATE FOCUSING TRANSDUCER
Filed May 24, 1954     4 Sheets-Sheet 1
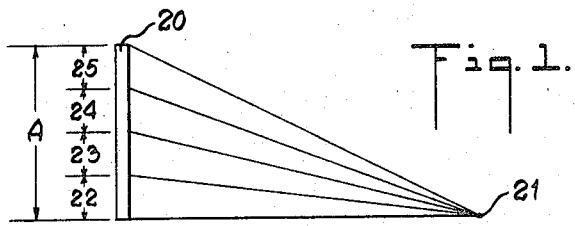
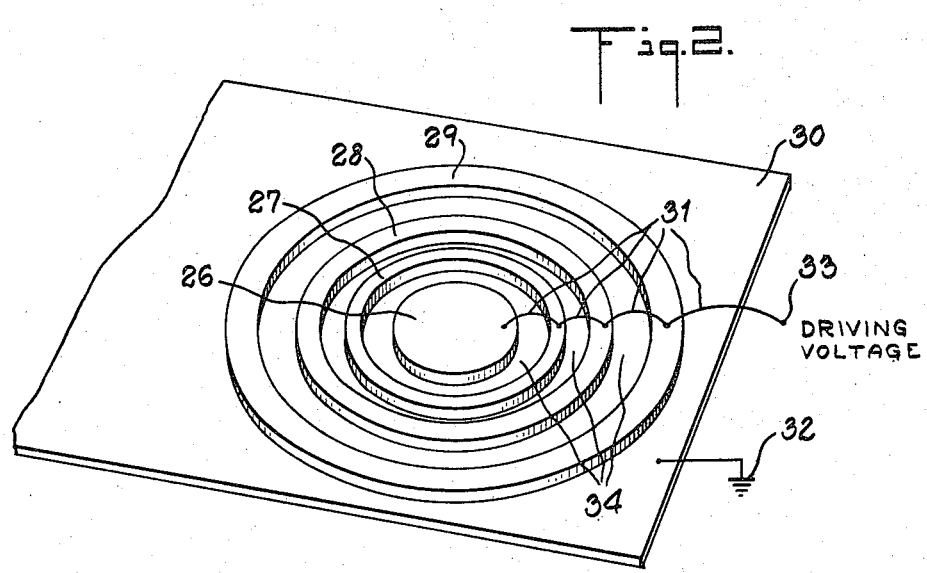
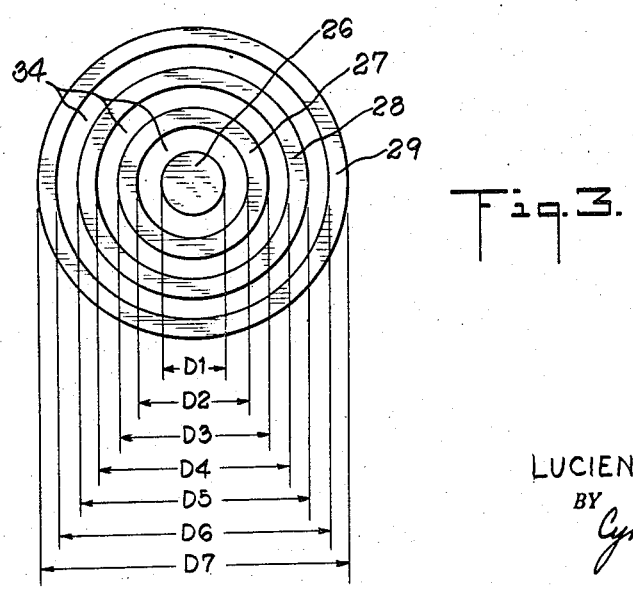
INVENTOR.
LUCIEN A. PETERMANN
BY
Cyrus D. Samuelson
ATTORNEY Feb. 24, 1959     L. A. PETERMANN     2,875,355
ULTRASONIC ZONE PLATE FOCUSING TRANSDUCER
Filed May 24, 1954     4 Sheets—Sheet 2
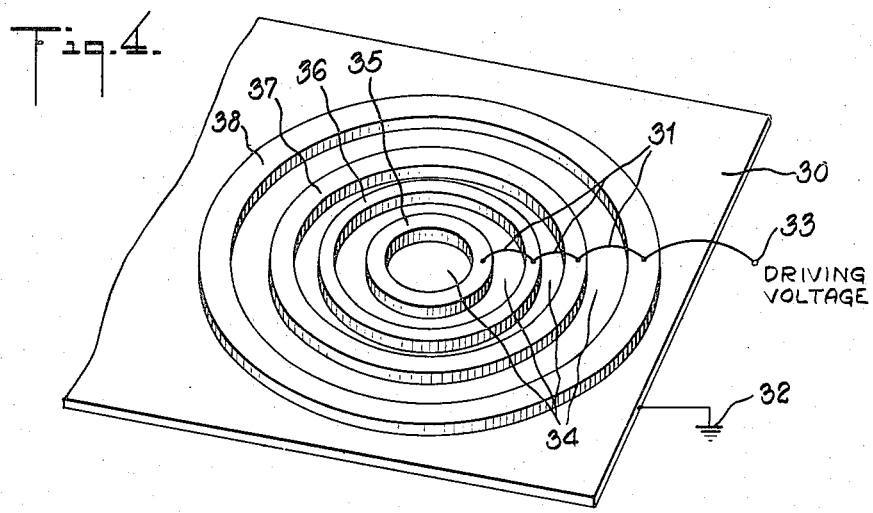
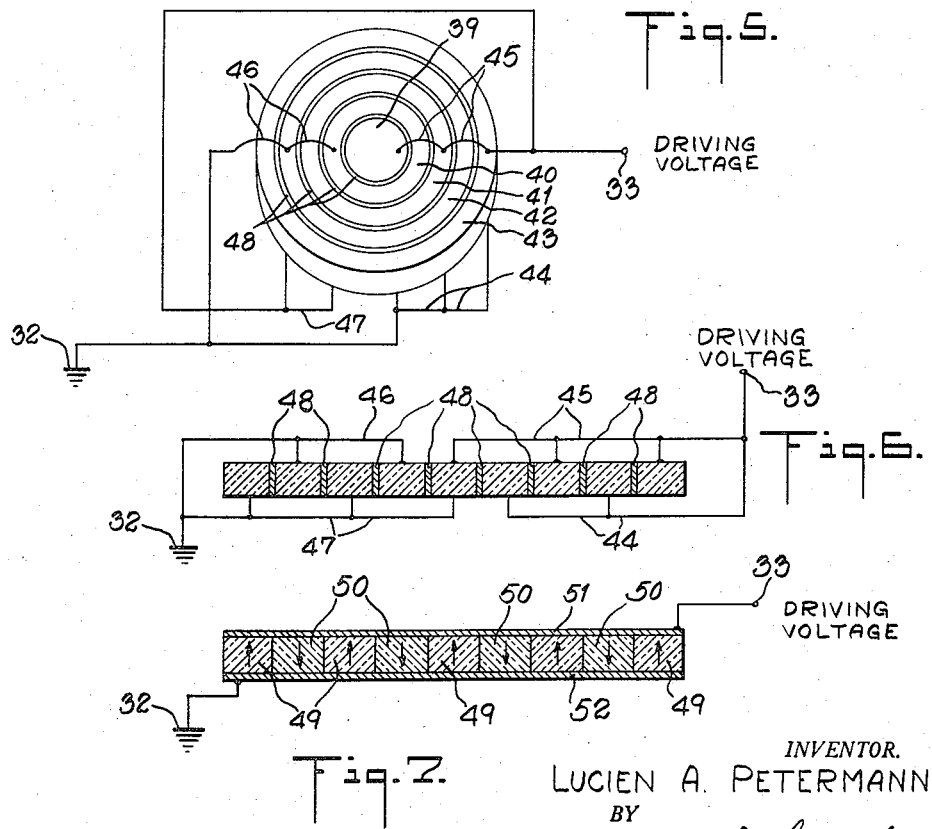
INVENTOR.
LUCIEN A. PETERMANN
BY
Cyrus D. Samuelson
ATTORNEY Feb. 24, 1959 L. A. PETERMANN 2,875,355
ULTRASONIC ZONE PLATE FOCUSING TRANSDUCER
Filed May 24, 1954 4 Sheets-Sheet 3

INVENTOR.
LUCIEN A. PETERMANN
BY
Cyrus D. Samuelson
ATTORNEY

Feb. 24, 1959     L. A. PETERMANN     2,875,355
ULTRASONIC ZONE PLATE FOCUSING TRANSDUCER
Filed May 24, 1954     4 Sheets-Sheet 4

INVENTOR.
LUCIEN A. PETERMANN
BY
*Cyrus D. Samuelson*
ATTORNEY

United States Patent Office 2,875,355
Patented Feb. 24, 1959

2,875,355

ULTRASONIC ZONE PLATE FOCUSING TRANSDUCER

Lucien A. Petermann, Metuchen, N. J., assignor to Gulton Industries, Inc., a corporation of New Jersey Application May 24, 1954, Serial No. 431,699
Serial No. 431,699

1 Claim. (Cl. 310—9.5)

My invention relates to improvements in ultrasonic transducers.

An important object of my invention is to provide means for focusing ultrasonic waves so as to obtain high ultrasonic intensity level in the focal region.

A further object of my invention is to provide a high-efficiency means for focusing ultrasonic waves.

A still further object of my inventin is to provide focusing transducers of elementary shapes for ultrasonic waves.

Other objects and advantages of my invention will be apparent during the course of the following description.

Figure 8:
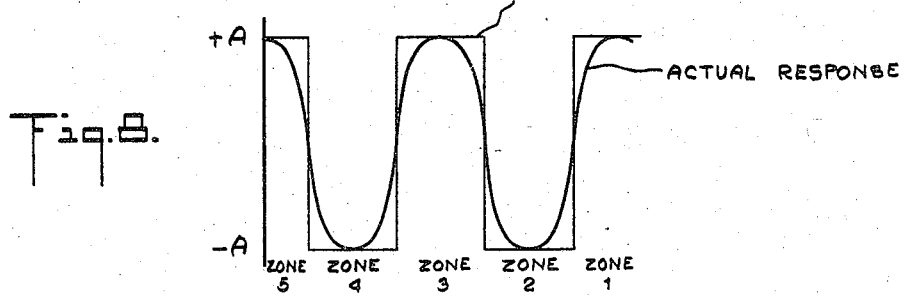
Figure 9:
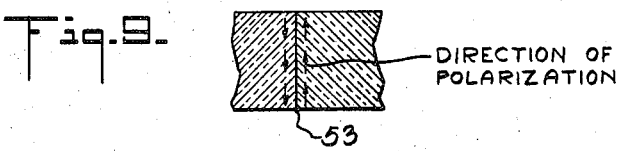
Figure 12:
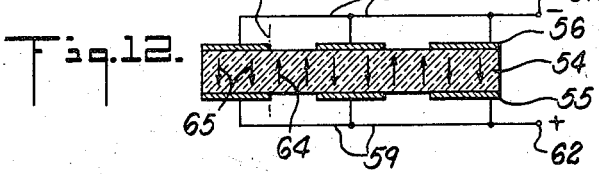
Figure 13:
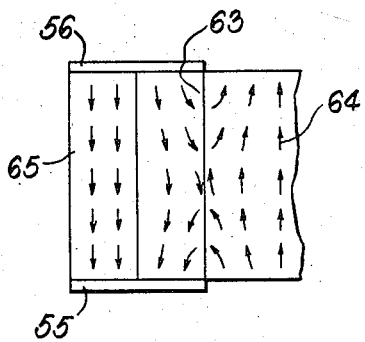
Figure 14:
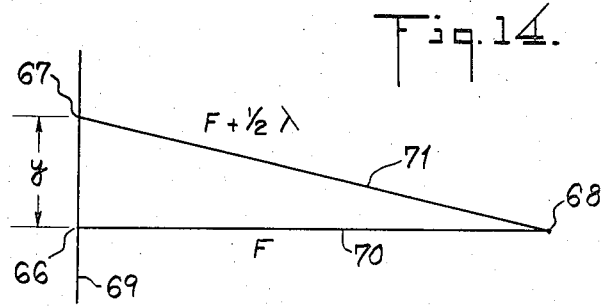
Figure 15:
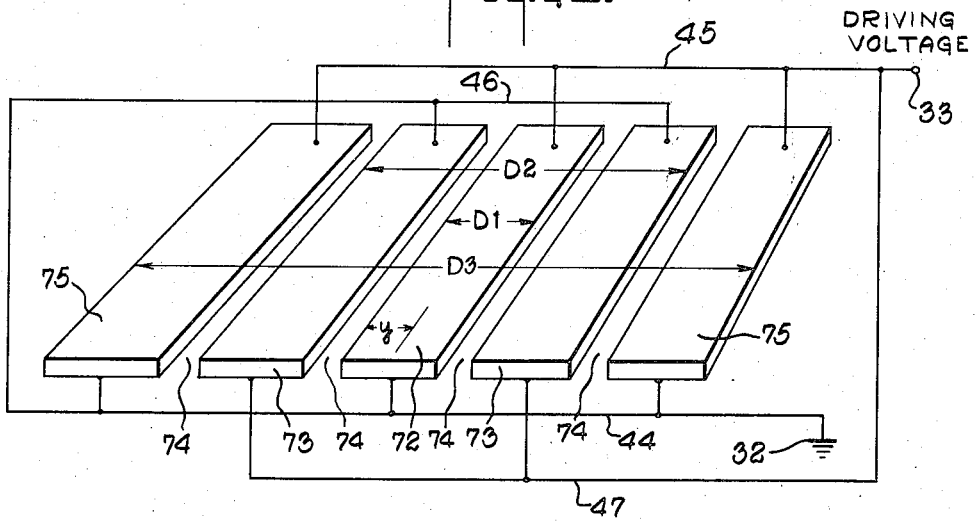
Figure 16:
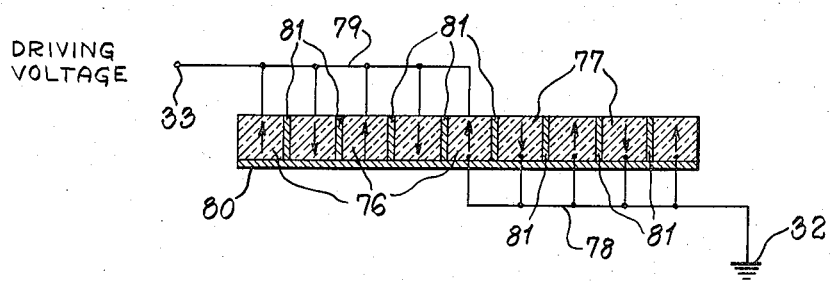

In the accompanying drawings, forming a part of this application, and in which like numerals are employed to designate like parts throughout the same, Figure 1 is used to explain the basic theory underlying my invention, Figure 2 is a view of one embodiment of my invention, illustrating an ultrasonic zone plate focusing transducer with an active center, Figure 3 is a plan view of the ultrasonic zone plate focusing transducer of Figure 2, Figure 4 illustrates an ultrasonic zone plate focusing transducer with an inactive center, Figure 5 illustrates an ultrasonic zone plate focusing transducer in which phase reversal from zone to zone is accomplished by reversing the electrode polarity, Figure 6 is a vertical section of the ultrasonic zone plate focusing transducer of Figure 5, Figure 7 illustrates a one-piece ultrasonic zone plate focusing transducer in which the polarization in adjacent zones is reversed, Figure 8 is an illustration comparing the theoretical and the actual output of an ultrasonic zone plate focusing transducer in which the polarization is reversed in adjacent zones, Figure 9 illustrates the ideal polarization vector distribution at a boundary between two adjacent zones, Figures 10 through 13 illustrates a method of obtaining reversed polarization direction in adjacent zones and the practical polarization distribution at a boundary between adjacent zones, Figure 14 is employed to illustrate some of the calculations in the design of an ultrasonic zone plate focusing transducer, Figure 15 illustrates a rectangular-shaped ultrasonic zone plate focusing transducer, and Figure 16 illustrates a zone plate focusing transducer, each zone of which has been individually machined.

In the drawings, wherein for the purpose of illustration, are shown preferred embodiments of my invention, the numeral 20 represents the transmitting area, A, of a wave and the numeral 21 a point in space. The numerals 22, 23, 24 and 25 represent the first, second, third and fourth Fresnel zones respectively.

Numeral 26 designates an active element in the center (zone 1) of the ultrasonic zone plate focusing transducer, numeral 27 designates the active element in zone 3 and numerals 28 and 29 designate the active elements in zones 5 and 7 respectively. Numeral 30 designates the conducting base plate on which the transducer assembly is mounted and to which one side of the active elements 26, 27, 28 and 29 are electrically connected. Numeral 31 designates the electrical connections between the faces of active elements 26, 27, 28 and 29 which are opposite the base plate 30. Numeral 32 designates the ground connection and numeral 33 designates the terminal to which the driving voltage is applied. Numeral 34 designates the inactive spaces between active zones. The space between 26 and 27 is zone 2, that fetween 27 and 28 is zone 4 and that between 28 and 29 is zone 6.

Numeral 35 represents the active element in zone 2 and numerals 36, 37, and 38 designate the active elements in zones 4, 6 and 8 respectively. The space 34 enclosed by active element 35 is zone 1. That between elements 35 and 36 is zone 3, that between 36 and 37 is zone 5 and that between 37 and 38 is zone 7. Numeral 39 designates the inner active zone of a solid zone plate transducer, numeral 40 designates the next inner active zone of a solid zone plate focusing transducer and numerals 41, 42 and 43 designate the successive active zones beyond the second, counting from the inside out.

Numeral 44 designates the ground connections for the odd zones, numeral 45 designates the driving voltage connections for the odd zones, numeral 46 designates the ground connections for the even zones and numeral 47 designates the driving voltage connections for the even zones. Numeral 48 designates the insulation between the zones, this insulation may be of different material than the transducer or may be a portion of the transducer from which the electrodes have been removed.

Numeral 49 designates the active odd zones and numeral 50 designates the active even zones. Numeral 51 designates the electrode on the upper face and numeral 52 represents the electrode on the lower face of a one-piece zone plate focusing transducer which has its adjacent zones oppositely polarized.

Numeral 53 designates the theoretical boundary between any two adjacent zones of a one-piece transducer, numeral 54 designates the material to be polarized, numeral 55 designates the lower electrode and numeral 56 designates the upper electrode. Numeral 57 designates the portions from which electrode 55 has been removed and numeral 58 the portions from which electrode 56 has been removed. Numeral 59 designates the connections between the remaining portions of electrode 55 and numeral 60 designates the connections between the remaining portions of electrode 56. Numerals 61 and 62 designate the terminals to which the polarizing voltage is applied. Numeral 63 designates the boundary between two oppositely polarized zones, numeral 64 designates the zone in which the polarization is not reversed and numeral 65 that in which it is reversed.

Numeral 66 designates the center of a zone plate, numeral 67 designates a point on the circumference of the first zone, numeral 68 designates the focus, numeral 69 designates the zone plate, numeral 70 designates the focal length and numeral 71 designates the distance from the focus 68 to the point 67.

Numeral 72 designates the active inner zone transducer, numeral 73 designates the active elements in zone 2, numeral 74 designates the insulating spaces between the adjacent zones and numeral 75 designates the active elements in zone 3. The insulation between active elements may be of different material than the active elements or may be a portion of the transducer material from which the electrodes have been removed.

Numeral 80 designates the base plate on which the transducer is mounted and numeral 81 designates the insulating spaces between active elements 76 and 77. Numeral 76 designates the odd zone active elements and numeral 77 designates the even zone active elements. Numeral 78 designates the transducer ground connections and numeral 79 designates the transducer driving voltage connections.

The need for focusing ultransonic waves has been recognized for many years and many types of focusing devices have been used in an endeavor to obtain high ultrasonic intensity levels in the focal region without overdriving the transducer. Ultrasonic focusing is useful in such ultrasonic techniques as chemical emulsification processes, flaw detection and the like.

The use of zone plates in ultrasonics has been discussed by Lord Rayleigh and others, but all of those experiments and theoretical discussions described and used a separate zone plate as the focusing device, located between the original source of ultrasonic energy and the focal region. My invention makes use of the focusing property of the zone plate and employs the zone plate as the source of ultrasonic energy. This is accomplished by fabricating the transducer to the required shape and dimensions of a zone plate. This method is more efficient than the older ones since it eliminates one major element of the system and consequently attains a reduction of transmission losses and simplification of operation.

Figure 1 serves to illustrate the fundamental underlying theory of the zone plate technique. Numeral 20 is a finite area A from which a wave is transmitted, the area A being large with respect to the square of the wavelength of the ultrasonic wave. Point 21 is a point in the wave field produced by area 20. Assuming that each point of area 20 is the source of a wave and that all the waves have the same phase on A, 20, the amplitude of vibration at point 21 is the geometrical sum of the elementary amplitudes produced by all the waves of A. The phases of these components at the point 21 depend on the distances of the elementary areas from 21. The zone nearest to 21 is designated as the first zone, 22. Zones 2, 3 and 4 are designated by numerals 23, 24 and 25 respectively. The extent of the areas of 22, 23, 24 and 25 is determined by the distance from 21 and the wavelength of the propagated wave. The area of these areas, known as zones, is determined such that wave components reaching 21 from it must not produce phase differences at 21 greater than $\pi$. Consequently, the distances from the focal point to any two points in a single zone cannot differ by more than one-half a wavelength. The contributions of 23 and 25 tend to cancel the contributions of 22 and 24 at 21 because of the phases of the wave components. The portions of the zones 22, 23, 24 and 25 shown in Figure 1 are only part of the Fresnel zones, the balance of them are a mirror of those shown in the figure, rotated around the lowest line connecting 21 and 20.

In optics, zone plates have been used to focus light waves. Either the odd or even zones are suppressed by the use of opaque material. Increased intensity is obtained at the focus when either the odd or even zones are followed by a phase shifting medium so that the components contributed by all the zones are in phase at the focus. There are several related points in space at which the effect of the zone plate is to raise the amplitude of the wave as compared to the amplitude without the zone plate.

In ultrasonics, the same basic theory holds for most of the important characteristics of zone plates and experiments have been performed employing an ultrasonic transducer and a focusing zone plate between the transducer and the focal point. However, it has not been possible to reverse the phase of adjacent zones without a resultant loss of energy when employing a source of ultrasonic energy separate from the zone plate. I have discovered that an efficient ultrasonic transducer, capable of producing high ultrasonic intensity levels in the focal region, may be constructed in the shape of a zone plate. The advantage of such a transducer is its simple shape, the simplified operation due to the elimination of the necessity of carefully adjusting the positions of the separate transducer and the zone plate in order to obtain the proper focus and the gain in intensity level at the focus over the intensity level with the separate source of ultrasonic energy and zone plate. In addition, one embodiment of my invention teaches a method of reversing the phase of either the odd or even zones of manufactured piezoelectric materials, such as barium titanate, in order to obtain higher intensity in the focal region.

Figure 2 illustrates one embodiment of my invention, being a zone plate focusing transducer with the even zones suppressed. The transducers are mounted on a base plate 30 which is electrically connected to ground 32. The opposite faces of the transducers 26, 27, 28 and 29 are electrically connected by 31 and the ultrasonic driving voltage is applied at 33. This type of ultrasonic zone plate focusing transducer produces a gain in intensity of approximately 16 at the focus. The gain in intensity at the focus is approximately equal to the square of the number of zones. This relationship holds within reasonable limits, that is: under those conditions wherein the focal length is of the same order of magnitude as the distance from the focus to a point on the circumference of the outermost active zone. When calculating gain in intensity, only the number of active zones in the transducer are considered. This type of ultrasonic zone plate focusing transducer may be comprised of natural or manufactured piezoelectric materials, ferroelectric materials or the like.

Figures 3 and 14 serve to illustrate the method used for calculating the dimensions of the ultrasonic zone plate focusing transducer of Figure 2. The values derived for the dimensions of the various zones of Figure 2 apply equally as well to those of Figures 4, 5, 7, 15 and 16. The radius y of the inner or first zone is determined from the formula:

$$y^2 = \left(F + \frac{\lambda}{2}\right)^2 - F^2$$

where F, the focal length, is the distance 70 from the focus 68 to the center of the inner zone 66 of the transducer; the radius of the inner zone y is measured from 66 to point 67 on the circumference of the inner zone; and $\lambda$ is equal to the wavelength of the ultrasonic wave in the medium. D1, the diameter of the first or inner zone of the transducer is equal to 2y. Subsequent values of Dn are determined from the formula $Dn = \sqrt{n}$ times D1.

For example, the dimensions of the vadious zones of a zone plate focusing transducer with a focal length of 6 cm., an ultrasonic wave frequency of 800 kc. in a medium in which the velocity of the ultrasonic wave is $1.380 \times 10^5$ cm./sec. (kerosene), the transducer having a thickness resonance at 800 kc. (approximately 3.1 mm. for barium titanate), may be determined as follows: find $\lambda$ which is equal to the velocity of the ultrasonic wave in the medium divided by the frequency of the wave. From this, find y from the formula for y and from the value of y find D1 which is equal to 2y. Then the subsequent values of Dn may be determined from the formula for Dn. The letter n represents the rank of the zone for which the dimensions are being calculated.

For the numerical example given, following are the values of Dn for a seven zone ultrasonic zone plate focusing transducer: D1=2.04 cm., D2=2.90 cm., D3=3.56 cm., D4=4.12 cm., D5=4.64 cm., D6=5.10 cm. and D7=5.52 cm. These values apply to any type of zone plate focusing transducer such as the transducers of Figures 2, 4, 5, 7, 15 or 16 The flat plate type of zone plate focusing transducer shown in Figure 15 has the same dimensions as determined above. D1 is the lateral dimension of the central zone transducer 72. D2 is the lateral distance between the two outer edges of transducers 73, measured across 72 as shown in Figure 15. D3 is the lateral distance between the two outer edges of transducers 75, measured across 72 and 73 as shown in Figure 15.

The transducer shown in Figure 4 has the odd zones suppressed and is the complement of the transducer of Figure 2. This type may be used when it is desirable to have the center open for using a light or similar device in conjunction with the transducer. The dimensions of the various zones are the same as those of Figure 2.

Figure 5 illustrates a one-piece transducer which may be naturally or artificially polarized in the same direction normal to the surface. The boundaries 48 may be insulating material which has been inserted into the transducer material or it may be portions of the transducer material from which the electrodes have been removed. The upper faces of the odd active zones 39, 41 and 43 are connected electrically by 45 and thence to the terminal 33 to which the driving voltage is applied during operation of the ultrasonic transmission system of which the transducer is a part. The lower faces of the even zones 40 and 42, which are also active, are connected electrically by 47 and thence to 33. The lower faces of 39, 41 and 43 are connected together electrically by 44 and thence to the ground terminal 32 and the upper faces of 40 and 42 are connected together electrically by 46 and thence to the ground terminal 32. When the transducer is connected in this manner, the waves from all the zones are in phase at the focus. Figure 6, which illustrates a section of the transducer shown in Figure 5, shows the connections for driving the transducer as described above.

The connections for an artificially polarized piezoelectric or ferroelectric transducer in which the adjacent zones are oppositely polarized are made as depicted in Figure 7. Numeral 49 designates the odd active zones, numeral 50 the even active zones, numeral 51 the electrode on the upper face which is connected to the driving voltage terminal 33 and numeral 52 the electrode on the lower face which is connected to the ground terminal 32.

Figure 8 is a comparison of the theoretical response of an ultrasonic zone plate focusing transducer and the actual response of such a transducer which has been produced by the method of reverse polarization described in the following paragraphs.

Figure 10:
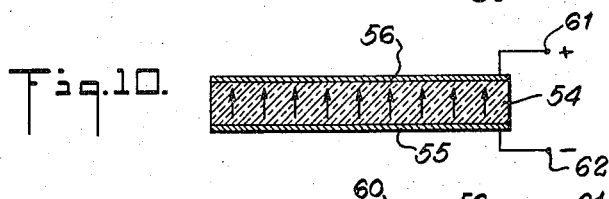
Figure 11:
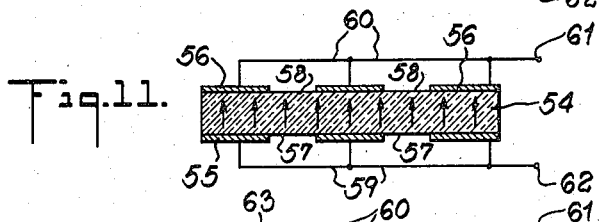

Figure 9 depicts the ideal polarization condition at a boundary 53 between any two adjacent zones and numeral 63 in Figures 12 and 13 represents the actual boundary conditions between any two adjacent zones. In Figure 10, numeral 54 represents the material to be polarized and numerals 55 and 56 represent the electrodes on the opposite faces of the material 54. Direct current polarizing voltage is applied to connections 61 and 62, in this case the positive potential is applied to 61 and the piece is polarized in the direction of the arrows of Figure 10. Portions of electrodes 55 and 56 are removed, space 57 designating the portions of 55 which have been removed and space 58 designating the portions of 56 which have been removed. The dimensions of the amount removed are determined by the zone dimensions which are calculated from the formulas previously explained. The portions of 55 which remain are electrically connected by 59 and thence to 62 and the portions of 56 which remain are electrically connected by 60 and thence to 61. The positive potential of a direct current polarizing voltage is now connected to 62 and the polarization is now as shown in Figure 12. Numeral 63 designates any boundary between two adjacent zones and Figure 13 depicts the actual polarization distribution at the boundary. The field pattern at the boundary is similar to a family of hyperboles. Another embodiment of my invention is as shown in Figure 16 wherein each zone is a separately manufactured and machined transducer rather than the one-piece transducer previously described. This has the advantage of eliminating the boundary effects of the one-piece transducer while still maintaining the advantage of reversed polarization from zone to zone. The boundary between adjasent zones can consist of a thin air gap or other insulating material without reducing the effectiveness of the device. The resultant effective vibration is the geometrical sum of the vibrations of elementary portions of a transducing region and so long as the resultant effective vibration is kept correct by proper electrical connections, the individual zone polarizations may be in either direction.

While I have described my invention by means of specific examples and in specific embodiments, I do not wish to be limited thereto for obvious modifications will occur to those skilled in the art without departing from the spirit of my invention or the scope of the subjoined claim.

Having thus described my invention, I claim:

An ultrasonic zone plate focusing transducer for obtaining a concentration of ultrasonic energy at a predetermined focal point in the medium into which the energy is propagated comprising a circular disc of uniform thickness of ferroelectric ceramic material, a pair of electrodes affixed to said disc of ceramic material on the opposite surfaces thereof and covering substantially all of said surfaces, and means for applying driving voltage to said transducer, said disc being polarized in the directions normal to its surfaces forming a plurality of alternately polarized concentric zones, the innermost of said zones being designated the first and the other outer zones being numerically ranked in order counting outward from said innermost zone, the radii of said zones being determined by the distance of said transducer from the focal point and the wavelength of the ultrasonic wave, the radius of the innermost zone being given by the formula $$y^2 = \left(F + \frac{\lambda}{2}\right)^2 - F^2$$

wherein $y$ is the radius of said innermost zone, $\lambda$ is the wavelength of the ultrasonic wave in the medium and $F$ is the distance from said transducer to the focal point, the radius of any outer zone being substantially equal to the radius of said innermost zone multiplied by the square root of the rank of said outer zone.

References Cited in the file of this patent

UNITED STATES PATENTS

| | | |
|---|---|---|
| 2,063,947 | Pierce | Dec. 15, 1936 |
| 2,262,966 | Rohde | Nov. 18, 1941 |
| 2,427,062 | Massa | Sept. 9, 1947 |
| 2,451,967 | Massa | Oct. 19, 1948 |
| 2,458,288 | Moriarty | Jan. 4, 1949 |
| 2,490,452 | Mason | Dec. 6, 1949 |
| 2,540,412 | Adler | Feb. 6, 1951 |
| 2,685,041 | Bradfield | July 27, 1954 |
| 2,716,708 | Bradfield | Aug. 30, 1955 |